United States Patent
Hendriks

(10) Patent No.: US 7,123,571 B2
(45) Date of Patent: Oct. 17, 2006

(54) COMPOUND OBJECTIVE LENS WITH FOLD MIRROR

(75) Inventor: Bernardus Hendrikus Wilhelmus Hendriks, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 29 days.

(21) Appl. No.: 10/510,255

(22) PCT Filed: Mar. 20, 2003

(86) PCT No.: PCT/IB03/01189

§ 371 (c)(1), (2), (4) Date: Oct. 5, 2004

(87) PCT Pub. No.: WO03/085654

PCT Pub. Date: Oct. 16, 2003

(65) Prior Publication Data

US 2005/0117498 A1    Jun. 2, 2005

(30) Foreign Application Priority Data

Apr. 9, 2002 (EP) .................................. 02076386

(51) Int. Cl.
*G11B 7/00* (2006.01)
(52) U.S. Cl. ............................. 369/112.24; 369/112.28
(58) Field of Classification Search .................. 369/44, 369/100, 112
See application file for complete search history.

(56) References Cited

U.S. PATENT DOCUMENTS

| | | | | |
|---|---|---|---|---|
| 4,643,538 A | * | 2/1987 | Wilson | ........................ 359/641 |
| 4,794,586 A | * | 12/1988 | Korth | ........................ 720/662 |
| 5,202,868 A | * | 4/1993 | Terao et al. | ............. 369/44.17 |
| 5,432,763 A | | 7/1995 | Campbell et al. | |
| 5,446,565 A | * | 8/1995 | Komma et al. | .......... 369/44.23 |
| 6,016,226 A | * | 1/2000 | Arisawa | ..................... 359/661 |
| 6,025,959 A | * | 2/2000 | Moskovich | ................. 359/649 |
| 6,058,098 A | | 5/2000 | Kato | |
| 6,310,840 B1 | * | 10/2001 | Baartman et al. | ........ 369/44.15 |
| 6,507,543 B1 | * | 1/2003 | Fujimaki et al. | ......... 369/44.19 |
| 6,594,205 B1 | * | 7/2003 | Aarts et al. | ............. 369/44.23 |
| 6,704,250 B1 | * | 3/2004 | Ueyanagi | ................. 369/13.33 |
| 6,819,491 B1 | * | 11/2004 | Takahashi et al. | .......... 359/566 |
| 6,847,480 B1 | * | 1/2005 | Steenblik et al. | ........... 359/368 |
| 6,927,927 B1 | * | 8/2005 | Isono | ........................ 359/793 |
| 2002/0186476 A1 | * | 12/2002 | Sasano et al. | ............. 359/719 |
| 2003/0058777 A1 | * | 3/2003 | Martynov et al. | ..... 369/112.24 |

* cited by examiner

Primary Examiner—Thang V. Tran
Assistant Examiner—Parul Gupta

(57) ABSTRACT

A compound objective lens includes a first lens element and a second lens element, the first element including a mirror surface for internally redirecting a radiation beam passing through the first element. The objective lens has a numerical aperture greater than 0.65, and the focal length $F_1$ of the first element is related to the focal length F of the objective lens by the relation:

$$\frac{F_1}{F} > 2.5.$$

9 Claims, 1 Drawing Sheet

COMPOUND OBJECTIVE LENS WITH FOLD MIRROR

BACKGROUND OF THE INVENTION

1. Field of the Invention

This invention relates to optical systems including a combined objective lens and fold mirror, in particular but not exclusively for such a lens, for use in an optical scanning device for scanning optical record carriers using a built-in radiation source.

It is desirable to reduce the size of optical scanning devices for use, e.g., in portable devices. It is possible to reduce the size of a device by reducing the build height of the optical system. A typical optical system in an optical scanning device includes an objective lens, which may be a single lens or a compound, i.e., multiple element, lens, and a fold mirror. The build height is determined by the total height of the objective lens and by the height of the fold mirror. In a typical optical scanning device, the height of the fold mirror is greater than the entrance pupil diameter.

2. Description of the Related Art

U.S. Pat. No. 5,432,763 describes a combined single lens objective and fold mirror, in which the build height is reduced. A further such lens is described in German Patent DE-A-19654388.

For relatively high numerical aperture (NA) systems, i.e., NA>0.65, a two-element objective is desired to relax the manufacturing tolerances to acceptable levels.

U.S. Pat. No. 6,058,095 describes two-element high-NA objective lens designs without a combined fold mirror. One of the characteristics of the designs is that the focal distance $F_1$ of the first element facing the radiation source and the total focal distance F of the total system satisfies the relation:

$$1.7 < \frac{F_1}{F} < 2.5 \quad (1)$$

Japanese Patent Application No. JP-A-08201698 describes a combined lens element and fold mirror. The fold mirror is in the form of a curved surface, and the element is to compensate for field curvature. The element is used in combination with an objective lens of NA=0.55.

SUMMARY OF THE INVENTION

In accordance with the present invention, there is provided a compound objective lens comprising a first lens element and a second lens element, the first element comprising a mirror surface for internally redirecting a radiation beam passing through the first element, wherein the objective lens has a numerical aperture greater than 0.65, and wherein the focal length $F_1$ of the first element is related to the focal length F of the objective lens by the relation:

$$\frac{F_1}{F} > 2.5 \quad (2)$$

The present invention provides for multi-element objectives, allowing incorporation of a fold mirror within one element to reduce the build height of an optical scanning device incorporating such an objective, while being tolerant for de-centering of the second element and having appreciable field performance.

BRIEF DESCRIPTION OF THE DRAWING

Further objects, advantages and features of the invention will be apparent from the following more particular description of preferred embodiments of the invention, as illustrated in the accompanying drawing, in which.

DESCRIPTION OF THE PREFERRED EMBODIMENTS

Figure 1:
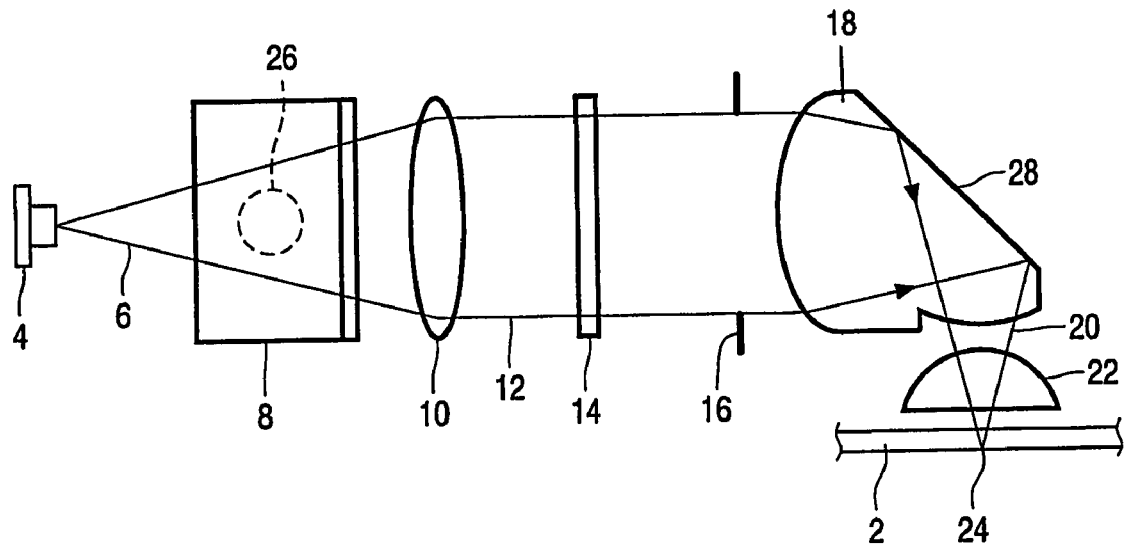
FIG. 1 is a schematic illustration of components of an optical scanning device arranged in accordance with an embodiment of the invention.

FIG. 1 shows components of an optical scanning device in an embodiment of the invention, in which a two-element compound lens is used in an optical head for scanning an optical record carrier 2.

The record carrier 2 is in the form of an optical disk comprising a transparent layer, on one side of which at least one information layer is arranged. The side of the information layer facing away from the transparent layer is protected from environmental influences by a protection layer. The side of the transparent layer facing the device is called the entrance face. The transparent layer acts as a substrate for the record carrier by providing mechanical support for the information layer(s). Alternatively, the transparent layer may have the sole function of protecting the information layer(s), while the mechanical support is provided by a layer on the other side of the information layer(s), for instance by the protection layer. Information may be stored in the information layer(s) of the record carrier in the form of optically detectable marks arranged in substantially parallel, concentric or spiral tracks. The marks may be in an optically readable form, e.g., in the form of pits, or areas with a reflection coefficient or a direction of magnetization different from their surroundings, or a combination of these forms.

The scanning device comprises a linearly polarized radiation source in the form of a semiconductor laser 4 emitting a radiation beam 6. The radiation beam is used for scanning the information layer(s) of the optical record carrier 2. A polarizing beam splitter mirror 8 transits the diverging radiation beam 6 on the optical path towards a collimator lens 10, which converts the diverging beam 6 into a collimated beam 12. The beam 12 is transmitted through a quarter-wave retarder plate 14, which converts the radiation to form a circularly polarized beam. An aperture stop 16 defines the entrance pupil $D_1$ (see FIG. 2), of an objective lens system 18, 22. The objective lens system may comprise two or more lenses and/or a grating. The objective system in FIG. 1 consists in this example of two elements, a first lens 18, and a second lens 22 arranged between the first lens 18 and the position of the record carrier 2. The first lens element reflects the beam through 90° using an internal fold mirror 28, having a mirrored outer surface, and changes the collimated beam 12 to a converging beam 20 incident on the second lens element 22, the second lens element 22 transforms the beam to a more highly convergent beam incident on the entrance face of the record carrier 2. The highly converging beam forms a spot 24 on the information layer currently being scanned.

Radiation reflected by the information layer forms a diverging, circularly, polarized beam, transformed into a substantially collimated beam by the objective system 18, 22. The quarter-wave plate 14 transforms the beam to form a linearly polarized beam, having an orthogonal polarization to the originally emitted beam. The beam is refracted to form a converging beam by the collimator lens. The beam splitter 18 separates the forward and reflected beams by transmitting the majority of the converging beam towards a detection system 26. The detection system 26 captures the radiation and converts it into electrical output signals which are processed by signal processing circuits. One of the signals is to form an information signal, the value of which represents information read from the information layer, a focus error signal and a radial error signal.

Figure 2:
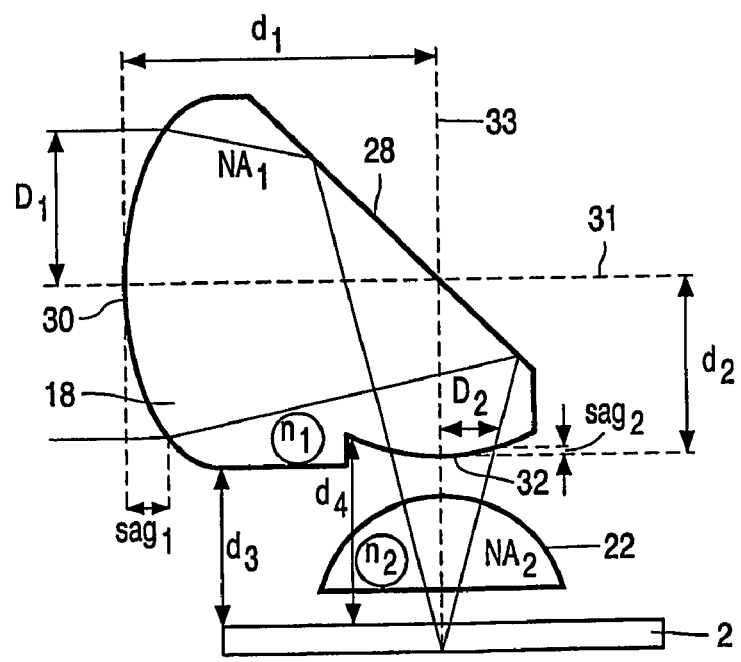
FIG. 2 is a cross-sectional view of an objective lens system, in accordance with an embodiment of the invention.

FIG. 2 illustrates the two-element objective 18, 22 in detailed cross-section. The compound lens 18, 22 has a relatively high numerical aperture, namely a numerical aperture greater than 0.65. More preferably, the compound lens 18, 22 has a numerical aperture of greater than 0.8.

The first lens element 18 may be formed from an integrally molded plastics material. The element 18 includes a first lens surface 30, centered on an optical axis 31, and a second lens surface 32, centered on a second optical axis 33. The first and second optical axes are arranged perpendicular to one another. A planar mirror surface 28 is arranged at 45° to each of the first and second optical axes, and coincides with the point at which the two optical axes cross. The first lens element 18 has a refractive index $n_1$, and the beam within the first element has a numerical aperture of $NA_1$.

The entrance pupil is shown as distance $D_1$ in FIG. 2. The radius of the beam on exit from the first element 18 at the second lens surface 32 is shown in FIG. 2 as distance $D_2$. The axial distance between the vertex of the first lens surface 30 and the crossing point of the two optical axes is shown as distance $d_1$ in FIG. 2. The distance between the vertex of the second lens surface 32 and the point at which the two optical axes cross is shown as distance $d_2$ in FIG. 2. The shortest distance between the first lens surface 30 and the entrance face of the location of the disk 2, measured parallel to the first optical axis 31, is shown as distance $d_3$ in FIG. 2. The furthest distance between the second lens surface 32 and the entrance face of the disk, measured parallel to the second axis 33, is shown as distance $d_4$ in FIG. 2. The first lens surface 30 is rotationally symmetric about the first optical axis and has a radius of curvature $R_1$. The first lens surface 30 preferably includes a physical feature defining the entrance pupil $D_1$, of the lens 18, such as a discontinuity in its cross section and/or an opaque annular covering acting as the aperture stop 16.

The sag of the first lens surface at the entrance pupil, $sag_1$, namely, the axial distance between the vertex of the first lens surface 30 and the entrance pupil of the lens, measured from the vertex of the lens in the direction of rays entering the lens from the radiation source, is generally a positive value, but may be zero or have a negative value.

The second lens surface 32 is rotationally symmetric about the second optical axis and has a radius of curvature $R_2$. The sag of the second surface at the radius of the exit beam, $sag_2$, namely, the axial distance to the point at which outermost rays, those coinciding with the entrance pupil of the lens, exit the lens element 18, measured from the vertex of the lens in the direction opposite to that of rays passing through the lens from the radiation source, is generally a positive value, but may be zero or have a negative value.

The second lens element 22 is a plano-convex lens element and may be formed from a molded plastics material. Note, however, that the second lens element may have a convex-convex or a convex-concave design. The second lens element 22 has a refractive index $n_2$ and the beam within the second lens has a numerical aperture of $NA_2$ within the second lens element.

The two-element objective lens 18, 22, allowing incorporation of a fold mirror in the first element, and being tolerant for de-centering of the second element of the objective facing the disc and having appreciable field performance, is characterized in that the focal distance $F_1$ of the first element facing the radiation source and the focal length F of the total system satisfy the relation:

$$\frac{F_1}{F} > 2.5 \tag{3}$$

Preferably, to provide the advantage of improved manufacturing tolerances by means of the first element, the following relation also applies:

$$\frac{F_1}{F} > 4 \tag{4}$$

For improved performance, the thickness $d_1$ and $d_2$ of the first element 18 comply with the relations:

$$d_1 > sag_1 + D_1 \equiv Q_1 \tag{5}$$

$$d_2 > D_1 + sag_2 - \frac{NA_1}{\sqrt{n_1^2 - NA_1^2}}[d_1 - D_2 - sag_1] \equiv Q_2 \tag{6}$$

Furthermore, for improved build height reduction, the distances $d_3$ and $d_4$ relating to the first element 18 comply with the relation:

$$d_3 < d_4 \tag{7}$$

The focal length $F_1$ of the first lens element is related to the radii of curvature $R_1$, $R_2$ of the first and second lens surfaces 30, 32 by the following relation:

$$\frac{1}{F_1} = (n_1 - 1)\left[\frac{1}{R_1} - \frac{1}{R_2} + \frac{(n_1 - 1)(d_1 + d_2)}{n_1 R_1 R_2}\right] \tag{8}$$

The sign convention selected is such that, when the two surfaces are convex (as per the embodiment shown in FIG. 2), radius $R_1$ of the first surface 30 is positive, while radius $R_2$ of second surface 32 is negative.

The focal length F of the total system is given by the relation:

$$F = D_1/NA \tag{9}$$

where NA is the numerical aperture of the entire objective lens 18, 22.

Table 1 below sets out characteristics of nine different embodiments of first lens element in accordance with the invention. The numerical aperture of these examples is 0.85 and the radiation beam has wavelength of 405 nm. The cover layer of the disc has thickness of 0.1 mm and is made of Polycarbonate (refractive index 1.622). Meanwhile, Table 2 below sets out further detailed characteristics relating to the examples.

In designs one to eight, the first element 18 is made of PMMA (refractive index 1.506) and the second element 22 is made of Polycarbonate (refractive index 1.622). In design nine both elements are made of COC (refractive index 1.550). The entrance surface of the second element 22 is aspherical, while the exit surface is flat in all examples. The distance between this flat front facet and the disk is 0.075 mm in all examples. The first element 18 has an aspherical first lens surface 30 for all examples. For examples one to three, the second lens surface 32 of the first element is flat, while for the other examples, it is aspherical.

TABLE 1

All distances are specified in [mm]:

| Example # | $D_1$ | $R_1$ | $R_2$ | $F_1$ | F | $F_1/F$ |
|---|---|---|---|---|---|---|
| 1 | 0.75 | 1.128 | infinity | 2.229 | 0.882 | 2.527 |
| 2 | 0.65 | 1.247 | infinity | 2.464 | 0.765 | 3.220 |
| 3 | 0.50 | 1.010 | infinity | 1.996 | 0.588 | 3.395 |
| 4 | 0.50 | 1.077 | −2.452 | 1.684 | 0.588 | 2.864 |
| 5 | 0.45 | 1.087 | −1.747 | 1.540 | 0.529 | 2.911 |
| 6 | 0.40 | 1.405 | −0.955 | 1.350 | 0.471 | 2.866 |
| 7 | 0.35 | 2.495 | −0.674 | 1.199 | 0.412 | 2.910 |
| 8 | 0.30 | 15.769 | −0.529 | 1.037 | 0.353 | 2.938 |
| 9 | 0.65 | 1.093 | infinity | 1.987 | 0.765 | 2.597 |

TABLE 2

All thicknesses are specified in [mm]:

| Example # | $d_1$ | $d_2$ | $D_1$ | $D_2$ | $sag_1$ | $sag_2$ | $n_1$ | $NA_1$ | $d_1/Q_1$ | $d_2/Q_2$ |
|---|---|---|---|---|---|---|---|---|---|---|
| 1 | 1.20 | 0.80 | 0.75 | 0.358 | 0.259 | 0 | 1.506 | 0.331 | 1.189 | 1.293 |
| 2 | 0.98 | 0.62 | 0.65 | 0.407 | 0.169 | 0 | 1.506 | 0.253 | 1.197 | 1.067 |
| 3 | 0.78 | 0.50 | 0.50 | 0.330 | 0.112 | 0 | 1.506 | 0.217 | 1.275 | 1.109 |
| 4 | 0.73 | 0.55 | 0.50 | 0.368 | 0.104 | 0.033 | 1.506 | 0.173 | 1.209 | 1.093 |
| 5 | 0.68 | 0.50 | 0.45 | 0.348 | 0.084 | 0.040 | 1.506 | 0.145 | 1.273 | 1.073 |
| 6 | 0.60 | 0.58 | 0.40 | 0.359 | 0.045 | 0.072 | 1.506 | 0.057 | 1.348 | 1.249 |
| 7 | 0.60 | 0.58 | 0.35 | 0.375 | 0.011 | 0.106 | 1.506 | −0.035 | 1.662 | 1.258 |
| 8 | 0.60 | 0.58 | 0.30 | 0.387 | −0.011 | 0.142 | 1.506 | −0.123 | 2.076 | 1.260 |
| 9 | 1.00 | 0.70 | 0.65 | 0.353 | 0.193 | 0.004 | 1.550 | 0.301 | 1.186 | 1.240 |

With reference to the above tables, in relation to the above examples of preferred embodiments of the invention, the following further relations apply:

$$1\ mm < F_1 < 2.5\ mm \quad (10)$$

$$F < 1\ mm \quad (11)$$

Of the above embodiments, example four will be specified in further detail for the purpose of illustration of further features which may be applied in embodiments of the invention. The rotational symmetric shape of the two aspherical surfaces 30, 32 on the first element 18 and the aspherical surface on the entrance surface of the second element 22 can be described by the equation:

$$z(r) = \frac{r^2/R}{1+(1-r^2/R^2)^{1/2}} \ldots + B_4 \frac{r^4}{r_0^4} + B_6 \frac{r^6}{r_0^6} + B_8 \frac{r^8}{r_0^8} + B_{10} \frac{r^{10}}{r_0^{10}} + B_{12} \frac{r^{12}}{r_0^{12}} + B_{14} \frac{r^{14}}{r_0^{14}} + B_{16} \frac{r^{16}}{r_0^{16}} \quad (12)$$

with z being the position of the surface in the direction of the optical axis in millimeters, r the distance to the optical axis in millimeters, R the radius of the surface, $r_0$ the normalization radius and $B_k$ the coefficient of the k-th power of r.

For the first lens surface 30, the value of R is 1.077 mm, while the normalization radius $r_0$ is 1.0 mm. The values of $B_4$ to $B_{16}$ for this surface are −1.2272049, 25.404755, −322.03916, 2344.2049, −9920.327, 22580.5, −21393.565, respectively.

For the second lens surface 32, the value of R is −2.452 mm, while the normalization radius $r_0$ is 0.8 mm. The values of $B_4$ to $B_{16}$ for this surface are 0.30668874, −5.3977186, 46.80716, −102.58899, −645.43643, 3792.223, −5471.5526, respectively. The distance between the first element 18 and the second element 22 on axis is 0.05 mm. The thickness on axis of the second element 22 is 0.342 mm.

For the entrance surface of the second element 22, the value of R is 0.338 mm, while the normalization radius $r_0$ is 0.35 mm. The values of $B_4$ to $B_{16}$ for this surface are −0.09902575, 0.90152635, −4.0445013, 10.373491, −14.93898, 11.348149, and −3.465529, respectively.

While the above parameters are the result of detailed lens design in relation to the embodiment of example four, it should be noted that a similar treatment may be applied to the remaining examples.

It also should be noted that the invention is not limited to the embodiments of the invention set out above; further embodiments of the invention are envisaged, which fall within the scope of the invention as set out in the accompanying claims.

The invention claimed is:

1. A compound objective lens comprising a first lens element and a second lens element, the first element comprising a mirror surface for internally redirecting a radiation beam passing through the first element, wherein the objective lens has a numerical aperture greater than 0.65, and wherein the focal length $F_1$ of the first element is related to the focal length F of the objective lens by the relation:

$$\frac{F_1}{F} > 2.5.$$

2. The compound objective lens as claimed in claim 1, wherein the mirror surface is a planar mirror surface.

3. The compound objective lens as claimed in claim 1 or 2, wherein the focal length F of the objective lens is less than 1 mm.

4. The compound objective lens as claimed in claim 1, wherein:

$$\frac{F_1}{F} < 4.$$

5. The compound objective lens as claimed in claim 1, wherein the first element comprises a first lens surface arranged along a first optical axis and a second lens surface arranged along a second optical axis which is substantially orthogonal to the first optical axis, and wherein the first and second optical axes coincide at a point along the mirror surface.

6. The compound objective lens as claimed in claim 5, wherein:

$$d_1 > sag_1 + D_1$$

where $d_1$ is the distance between the vertex of the first lens surface and the point at which the two optical axes coincide, and $sag_1$ is the sag of the first lens surface at the entrance pupil $D_1$.

7. The compound objective lens as claimed in claim 5, wherein:

$$d_2 > D_1 + sag_2 - \frac{NA_1}{\sqrt{n_1^2 - NA_1^2}}[d_1 - D_2 - sag_1]$$

where $d_2$ is the distance between the vertex of the second lens surface and the point at which the two optical axes coincide, $sag_1$ is the sag of the first lens surface at the entrance pupil $D_1$, $NA_1$ is the numerical aperture of the beam in the first element, $n_1$ is the refractive index of the first element, $D_2$ is a radius on the second surface corresponding to the exit point on the second surface of a collimated ray incident upon the first surface at the entrance pupil $D_1$, and $sag_2$ is the corresponding sag of the second surface at radius $D_2$.

8. An optical scanning device comprising:

the compound objective lens as claimed in claim 1; and a radiation source for generating a radiation beam, said radiation beam passing through the compound objective lens to scan an optical record carrier.

9. the optical scanning device comprising:

the compound objective lens as claimed in claim 5; and a radiation source for generating a radiation beam, said radiation beam passing through the compound objective lens to scan an optical record carrier, wherein:

$$d_3 < d_4$$

where $d_3$ is the shortest distance between the closest point of the first lens surface and the location of the record carrier, measured parallel to the first optical axis, and $d_4$ is the furthest distance between the second lens surface and the location of the record carrier, measured parallel to the second optical axis.

* * * * *